INSTRUMENT FOR MEASUREMENT OF THIN MAGNETIC FILM PARAMETERS

Filed Sept. 9, 1963 5 Sheets-Sheet 1

INVENTORS.
DAVID M. ELLIS
CLIFFORD J. BADER
BY Francis A. Varallo
AGENT

INSTRUMENT FOR MEASUREMENT OF THIN MAGNETIC FILM PARAMETERS

Filed Sept. 9, 1963 5 Sheets-Sheet 2

INVENTORS.
DAVID M. ELLIS
CLIFFORD J. BADER

BY Francis A. Varallo
AGENT

INSTRUMENT FOR MEASUREMENT OF THIN MAGNETIC FILM PARAMETERS

INVENTORS.
DAVID M. ELLIS
CLIFFORD J. BADER
BY Francis A. Varallo
AGENT

INVENTORS.
DAVID M. ELLIS
CLIFFORD J. BADER
BY Francis A. Varallo
AGENT

May 31, 1966 D. M. ELLIS ET AL 3,254,298

INSTRUMENT FOR MEASUREMENT OF THIN MAGNETIC FILM PARAMETERS

Filed Sept. 9, 1963 5 Sheets-Sheet 5

INVENTORS.
DAVID M. ELLIS
CLIFFORD J. BADER
BY Francis A. Varallo
AGENT

United States Patent Office 3,254,298
Patented May 31, 1966

3,254,298
INSTRUMENT FOR MEASUREMENT OF THIN MAGNETIC FILM PARAMETERS

David M. Ellis, Malvern, and Clifford J. Bader, West Chester, Pa., assignors to Burroughs Corporation, Detroit, Mich., a corporation of Michigan Filed Sept. 9, 1963, Ser. No. 307,651
19 Claims. (Cl. 324—34)

The present invention relates generally to thin films or layers of ferromagnetic material, and more specifically to an instrument capable of determining directly the angular position of the magnetic moment or film magnetization vector in a small area of the film.

Thin ferromagnetic films have become increasingly prominent as computer storage elements. These films may be arranged to form data stores or memories of useful capacity and high reliability. As such, they offer a practical and economical solution to the continual problem of achieving higher speed memories.

Thin films of magnetic material may be produced which have a uniaxial anisotropy, or preferred (easy) axis or direction of magnetization in which substantially all of the magnetic domains lie parallel to this axis. Certain parameters of magnetic films are of primary importance in the design of data stores. These include the direction of the easy axis and its angular dispersion within a particular film element; the skew or angular variation in the direction of the easy axis among a group of elements; the anisotropy field, $H_k$, defined as the magnetization flux density in the direction transverse to the easy direction, that is, the hard direction; and the magnitude dispersion of $H_k$ throughout a film element.

The parameters of thin magnetic films having a uniaxial anisotropy have been measured by a variety of prior art techniques, including hysteresis loop tracers, torque magnetometers, Kerr optical systems and mechanical rotation of the film. In general, these techniques have the common disadvantage of providing information on only the gross properties of a continuous film area. Further, the measurements usually involve significant disturbances of the existing magnetization state of the sample under test.

In contrast, the present inventive technique permits direct observation of the angular position of the film magnetization vector in a small area of the film, with negligible effect on the remanent state of the material. Accordingly, the magnetic film may be studied, in the absence of significant external fields, for skewing of the preferred axis and its angular variation within the film sample; while the rotational parameters may be measured concurrently with the application to the film of a field of known magnitude.

In accordance with the present invention, an instrument is provided which relates magnetization vector position in a thin magnetic film to radio frequency (RF) mixing behavior under a crossed-wire probe positioned in close proximity to the film. The high sensitivity possible with tuned RF amplification permits nondestructive observation of small areas of the film and affords an angular resolution on the order of one-tenth degree. In this manner, accurate location of the film easy axis and direct indication of the magnetization vector rotation under the influence of a static field are readily obtainable.

It is therefore a general object of the present invention to disclose improved techniques for measurement of various parameters of thin magnetic films.

Another object of the present invention is to provide an accurate measuring instrument for use with thin magnetic films, and characterized by simplicity of structure and ease of operation.

A more specific object of the present invention is to provide an instrument for observing the position of the magnetization vector in selected small areas of the thin magnetic film element being examined.

These and other features of the invention will become more fully apparent from the following description of the annexed drawings, wherein.

Figure 1:
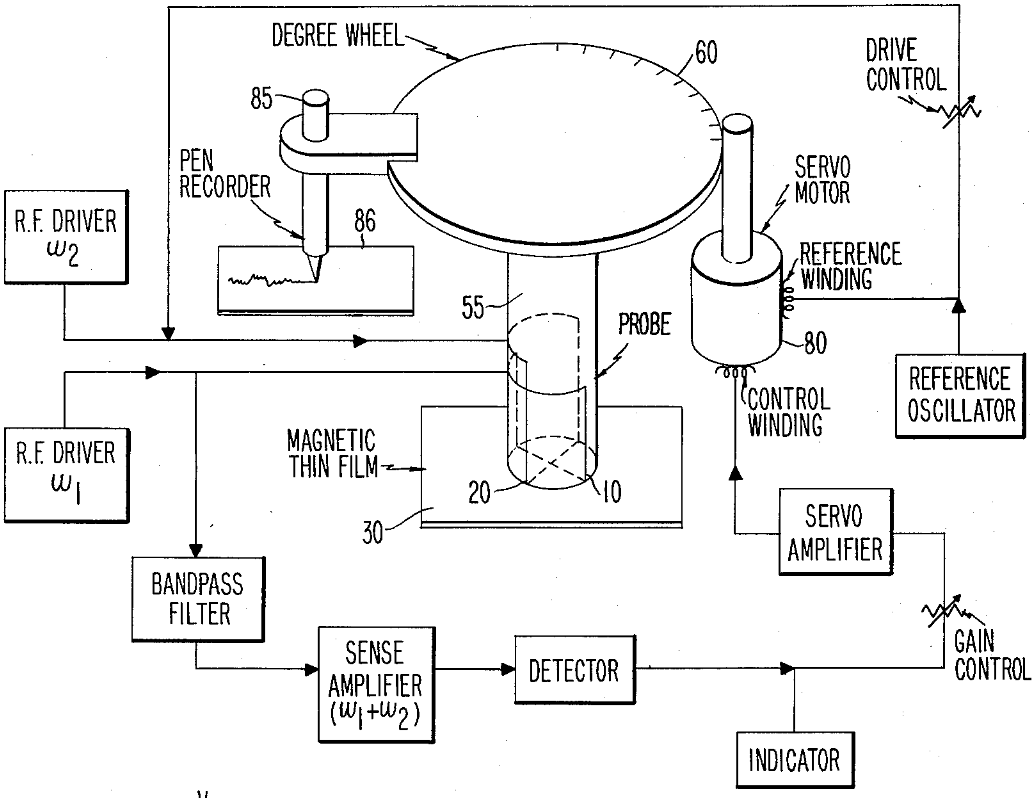
FIG. 1 is a block diagram representation of the instrument of the present invention.

FIG. 1 which depicts the general form of the instrument in block representation, is useful in illustrating the inventive concept involved in the observation of the magnetization vector position. A detailed description of the mechanical details of an actually operative embodiment of the instrument has been reserved for the subsequent consideration of FIGS. 4, 5 and 6.

In FIG. 1, a PROBE comprising two orthogonal conductors, 10 and 20, supported by a nonmetallic rod, is positioned close to the surface of the MAGNETIC THIN FILM being tested. Radio frequency currents of different frequencies "$\omega_1$" and "$\omega_2$," generated respectively by the R.F. DRIVERS of like designation, are applied concurrently to the respective conductors 10 and 20. The resulting excitation of the film by the small RF magnetic fields of two different frequencies causes combinatorial components of flux to be generated, that is, sum- and difference-frequency components. Although either component could be used, the sum-frequency component was chosen because for any two selected RF driver frequencies, the latter component yields a larger output voltage signal. The flux component at the sum frequency is sensed by one of the RF drive conductors, namely 10, which therefore, also serves as a sense conductor. The magnitude and phase of this sensed flux depends upon the angle $\theta_0$ between the magnetization vector M and the film easy axis, and upon the RF field angle $\psi$, which defines the probe angular position with respect to M.

The voltage signal induced in conductor 10 by the sum-frequency component passes through a BANDPASS FILTER, SENSE AMPLIFIER, and DETECTOR, and is then applied to an INDICATOR for visual display of its level. For reasons which will be explained fully hereinafter, it is observed that the voltage applied to the INDICATOR, which may be a D.C. meter, is zero when the sense conductor makes a right angle with the magnetic moment M. Stated another way, the output is zero when the sensed component of flux coincides with M. Attached to the PROBE on a common shaft is a DEGREE WHEEL indicating the actual probe angular position. Such position corresponds directly to the angular position of M in the film when the output voltage is properly nulled. Thus, in operating the instrument, the DEGREE WHEEL may be manually rotated, while the output voltage peaks and nulls are observed on the INDICATOR. In lieu of manual operation, a servo system as shown in FIG. 1 and including SERVO MOTOR, REFERENCE OSCILLATOR, SERVO AMPLIFIER, and DRIVE and GAIN CONTROLS respectively, together with a PEN RECORDER, may be employed. In the automatic system, the DEGREE WHEEL constantly indicates the M vector angular position as the film is traversed beneath the PROBE, and at the same time, an ink record of the variations in M is produced by the PEN RECORDER.

Figure 2:
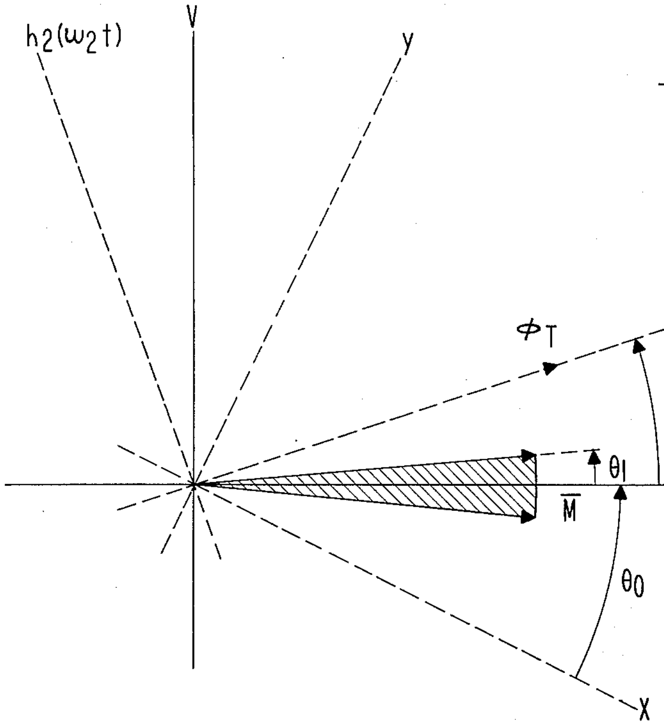
FIG. 2 depicts the coordinate system associated with the operation of the instrument.

Before proceeding with a consideration of the coordinate system of FIG. 2, it is well to review the concept of magnetic rotation. A thin ferromagnetic film possesses small dipole moments which, due to exchange energy and a single axis of anisotropy, are easily aligned and remain stable along a common axis. Thus, the dipole moments align to form a domain which may be represented by the moment M. M represents the magnitude and direction of the flux within a particular region or volume of the ferromagnetic material.

The quiescent position of M occurs where the resultant of torque imposing forces is zero, that is, where the energy is a minimum. For the case of a single domain having no external field applied, the quiescent position of M is along the axis of anisotropy, but in either one of two opposite directions. These directions are commonly designated the (+) and (−) states respectively. Any external field applied to M which has a component directed transverse to M, will produce an unbalanced torque on M. M will rotate until its direction is such that the unbalanced torque becomes zero.

In FIG. 2, the "$x$" and "$y$" axes represent the easy and hard axes of magnetization of the film, respectively. The magnetization vector M is rotated through $\theta_o$ by a D.C. magnetic field applied in the "$y$" or hard direction. A set of coordinate axes, "$u$" and "$v$" is defined such that "$u$" coincides with the equilibrium position of M. Hence "$u$" and "$v$" are rotated through angle $\theta_o$ counterclockwise from the "$x$" and "$y$" axes, as a result of the rotation of M. The axes "$h_1$" and "$h_2$," rotated through the angle $\psi$ from "$u$" and "$v$," represent respectively the direction of the RF magnetic fields generated by the probe wires. In practice, the component of flux $\theta_T$, coinciding with the "$h_1$" axis, is sensed by the appropriate probe conductor.

The small magnetic fields from the probe wires cause small angular oscillations of M around its equilibrium position. The instantaneous deviation is represented by the oscillation angle $\theta_1$, in FIG. 2. The latter angle can be related to the applied RF fields, and to the properties of the film, as described by the free energy equation:

$$e=\tfrac{1}{2}\sin^2\theta-h_x\cos\theta-h_y\sin\theta \qquad (1)$$

where "$e$" is the normalized free energy and $\theta$ represents the instantaneous angular distance of M from the film easy axis and "$h_x$" and "$h_y$" are applied fields.

The expression for $\theta_1$ as a function of time takes the form of a differential equation with periodic coefficients and forcing function; hence, the voltage induced by flux changes associated with the time variation of $\theta_1$ will, in general contain sum, difference, and harmonic components of the driving frequencies.

Figure 3A:
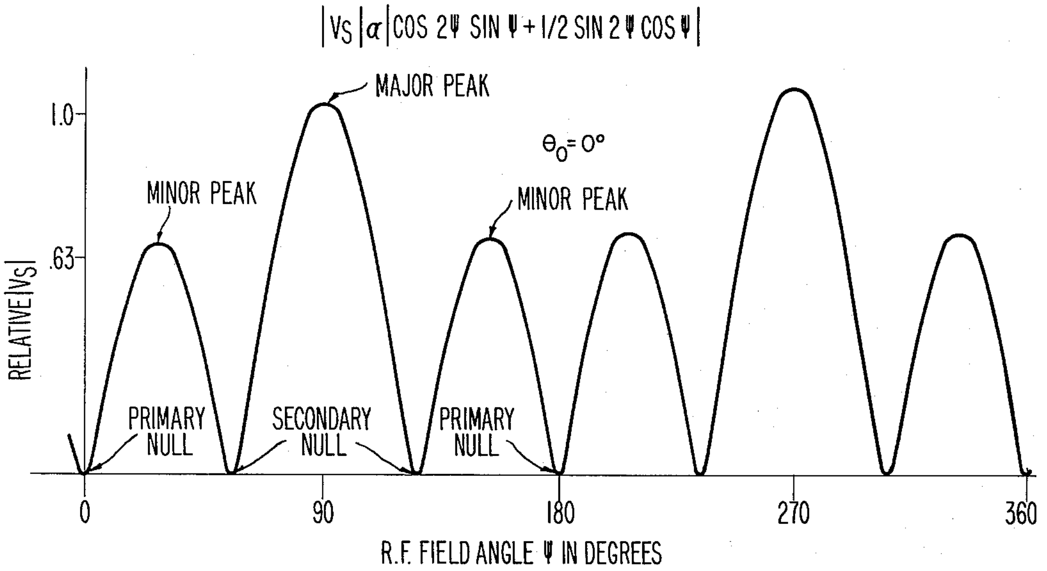
FIGS. 3A and 3B depict respectively the output voltage waveforms realized with the instrument of FIG. 1 under different operation conditions.
Figure 3B:
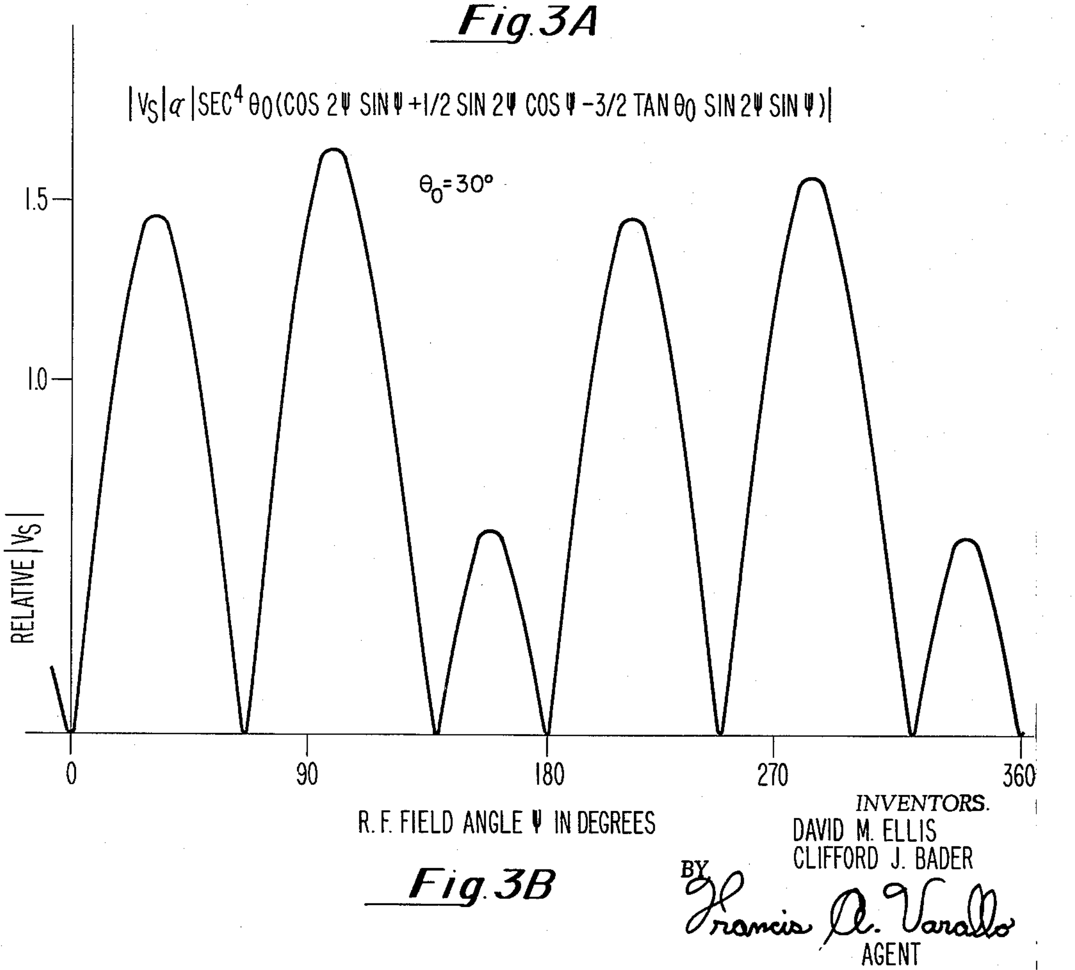
Figure 4:
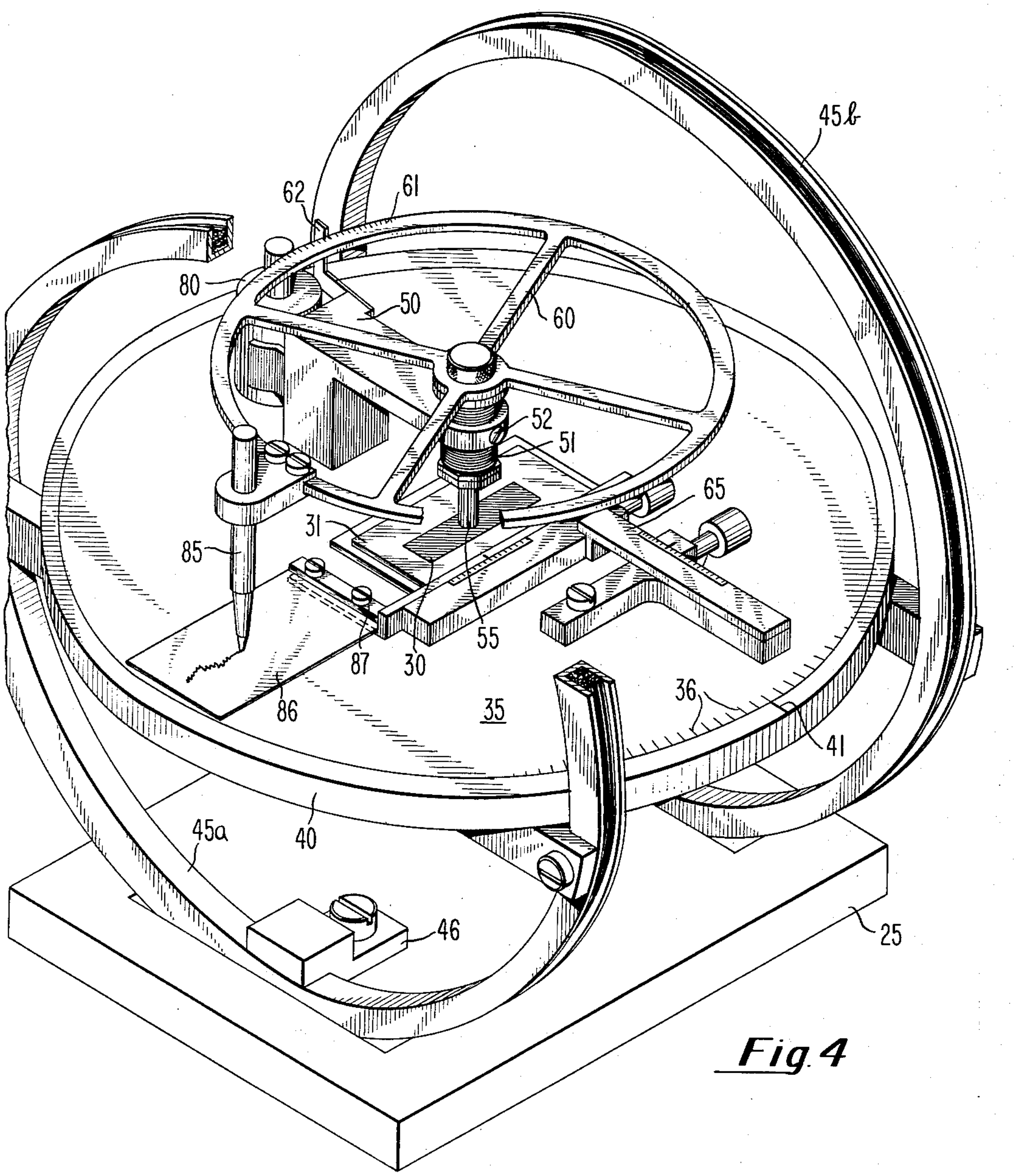
FIG. 4 is a diagrammatic representation of a practical form of the instrument.

With reference to FIGS. 3 and 4, it has been found that the sum-frequency output voltage, "$V_s$" is a function of the probe angle $\psi$, the initial rotation $\theta_o$ of M, and the applied RF drive fields. The $V_s$ proportionality with angles $\psi$ and $\theta_o$ is given by:

$$V_s\propto\sec^4\theta_o\,(\cos 2\psi\sin\psi+\tfrac{1}{2}\sin 2\psi\cos\psi-3/2\tan\theta_o\sin 2\psi\sin\psi) \qquad (2)$$

This expression is characterized by the appearance of six peaks and six nulls of output voltage as $\psi$ varies from 0 to 360 degrees. The size and position of the peaks, and the position of four of the nulls, are dependent upon the value of $\theta_o$. However, since each term of the equation for $V_s$ contains "$\sin 2\psi$" or "$\sin\psi$," nulls are always obtained when $\psi=0°$ or 180°. The latter nulls are regarded as "primary" nulls and are the ones of interest in the use of the instrument to determine the position of M. From a theoretical standpoint, the behavior of $V_s$ with $\psi$ is significant in that it tends to experimentally verify the theory of operation of the instrument, and as at practical matter, is useful in establishing which of the nulls are "primary."

Equation 2 for the output voltage, $V_s$, is a fundamental expression for the operation of the instrument. Equations 2–6 inclusive, while contributing to a more complete understanding of the invention, are nevertheless presented in a cursory manner. Accordingly, for a rigorous mathematical consideration and derivation of these equations, the reader is referred to the appendix of a technical paper entitled "Instrument for Observation of Magnetization Vector Position in Thin Magnetic Films," authored by the inventors of the instrument. This paper has been published in the Review of Scientific Instruments, volume 33, No. 12, pages 1429–1435, December 1962.

The existence of nulls at $\psi=0°$ and $\psi=180°$ is a consequence of the fact that no term containing $h_u$ (the component of the RF drive in the "$u$" direction, in FIG. 2) alone appears in the power series expression for $\theta_1$, which in general form, may be written:

$$\theta_1=a_1h_v+a_2h_v^2+b_2h_vh_u+a_3h_v^3+b_3h_v^2h_u+c_3h_uh_v^2+\ldots \qquad (3)$$

where "$h_v$" is the component of the RF drive in the "$v$" direction in FIG. 2.

When $\psi$ is 0, $h_1=h_u$ and $h_2=h_v$, the derivative of the previous equation with respect to time becomes $$\theta'=a_1h_2'+2a_2h_2h_2'+b_2(h_2'h_1+h_2h_1')+\ldots \qquad (4)$$

Since the total voltage $V_T$ appearing across the sensing conductor is proportional to $d\theta_T/dt$; where $\theta_T$ is the sensed component of M, it can be shown that, using prime notation for time derivatives, and assuming that $M=1$, $$-V_T\propto\theta_T'=\theta_1'\cos\theta_1\sin\psi-\theta_1'\sin\theta_1\cos\psi \qquad (5)$$

Since $\theta_1$ is a small angle, $\sin\theta_1\approx\theta_1$ and $\cos\theta_1=1$; thus $$-V_T\propto\theta_T'\theta_1'\sin\psi-\theta_1=\theta_1'\cos\psi \qquad (6)$$

In Equation 6, the only term with nonzero coefficient when $\psi=0$, is $\theta_1\theta_1'\cos\psi$. Thus the only possible sum-frequency output is that produced by the product of Equations 3 and 4. This multiplication produces no second degree terms containing both $h_1$ and $h_2$ or their derivatives. Any output which exists due to second degree terms for $\psi\neq 0$ will become arbitrarily large with respect to that caused at $\psi=0$ by higher degree terms in the product of Equations 3 and 4. Thus a null of $V_s$ will exist for small driving fields when $\psi=0$.

Exclusion of terms containing $h_u$ alone from the power series expression for $\theta_1$ is equivalent to assuming that a field applied along M produces no angular rotation of M. This condition and the validity of the power series representation then constitute the conditions necessary for the existence of the primary null.

FIGS. 3A and 3B show experimentally obtained output voltage plots for the cases $\theta_o=0°$ and $\theta_o=30°$ respectively. The graphs obtained show good correlation with the expected results from Equation 2. In FIG. 3A, it is noted that for $\theta_o=0°$, the major peaks occur at 90° and 270°, and are separated by two minor peaks of equal amplitude. In FIG. 3B, for $\theta_o=30°$, the overall amplitude of the pattern increases, while the major peaks shift slightly in angle and are separated by two minor peaks of dissimilar amplitude and position. The latter pattern distortion becomes more pronounced with increasing $\theta_o$. The waveforms of FIGS. 3A and 3B are based upon the absolute value of output voltage, that is, the rectified signal output from the sense amplifier. The sum-frequency output voltage, as described by Equation 2, undergoes successive phase reversals in the transition from peak to peak. The nulls theoretically represent an abrupt transition from one phase to the other, but are slightly rounded in the experimental plots because of amplifier noise and detector nonlinearity.

The equipment represented by the block diagram of FIG. 1 may be thought of as comprising the following units: (a) a test fixture carrying the probe, the magnetic film under test, a pair of Helmholtz coils and alignment mechanism; (b) the RF drivers, a sense amplifier, an output voltage indicator, and power supplies; (c) a tuning head separately mounted near the test fixture, containing coupling and filtering circuits; and (d) the servo system and recording mechanism. It should be emphasized that the foregoing units and their descriptions which follow refer to an actually operative mechanization of the inventive techniques disclosed herein. Therefore they are included solely for purposes of example and are in no way limitative of the invention. It will be obvious to those skilled in the art that specific dimensions, amplitudes of signals etc. may vary according to the materials, design and application, and that all such changes nevertheless fall within the scope of the present invention.

FIG. 4 illustrates the complete test fixture mounted on a platform 25. Nonmagnetic materials have been used throughout. The magnetic film 30 and its substrate 31 are carried by a base 35 which may be rotated through 360° in the plane of the film with respect to the Helmholtz coil field provided by the pair of coils **45*a* and 45*b*. The base 35 is held in position and is supported by a hoop-like member 40. The angular position of the base with respect to the coil field is indicated directly by the degree graduations 36 on the base 35 and the reference mark 41 on the base support 40. The base and coils are assembled in such a manner as to permit alignment of the base so that the ambient magnetic field including the earth's field is perpendicular to the film. This alignment has been readily accomplished within $\pm\frac{1}{2}°$ of solid angle by loosening the clamps 46** on each side of the coils and then by a trial and error procedure, tilting the base from its horizontal attitude while seeking minimum disturbance of M over a 360 degree rotation of the base. Under aligned conditions, the undesirable effects of the components of the ambient fields acting transverse to the easy axis of the film are virtually eliminated.

The probe mount assembly comprises a support arm 50, the probe 55 and degree wheel 60. The entire assembly is attached to the base 35 and is positioned so that the probe axis of rotation coincides with the axis of rotation of the base. The area of the film under the probe thus undergoes no translation with respect to the Helmholtz coil field during rotation of the base. The film sample 30 is positioned under the probe 55, by a suitable traversing mechanism 65 attached to the base. For example, the well-known commercial microscope-slide traversing mechanism has been employed successfully for this application.

A bushing 51 threaded into the support arm 50 carries a shaft to which the probe 55 is attached and permits adjustment of the spacing between the probe and the film sample 30. A locking screw 52 is provided to prevent accidental change of this adjustment. The probe threads into the lower end of the shaft and is firmly supported by the tapered shoulder. The opposite end of the shaft carries a degree wheel 60 bearing graduation 61. A pointer 62 fixed to the rear of the mount indicates the probe angular position with respect to the magnetization vector M of the film under test. As indicated previously the degree wheel 60 will give a direct indication of the equilibrium position of the M vector when the latter has been rotated from an initial position by an applied transverse field. Likewise, a direct indication of the skew in various samples or angular dispersion of the easy axis in a particular sample is obtained from the degree wheel.

Figure 5:
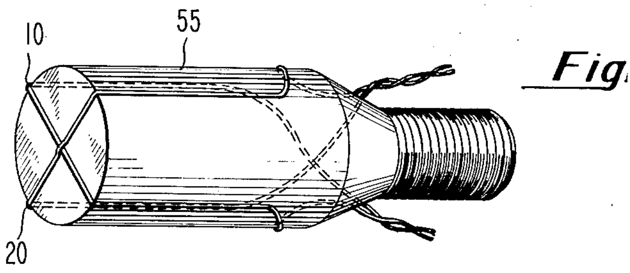
FIG. 5 is a detailed view of a typical probe, showing the crossed-wire arrangement.

FIG. 5 illustrates in greater detail the probe used in the present instrument. The probe 55 consists simply of the crossed wires, 10 and 20, which may be, for example, No. 36 or No. 49 enameled copper cemented to the end of a phenolic or nylon rod. The wires are brought back along the sides of the probe, and are then twisted in pairs to reduce stray magnetic fields. Probes demonstrating good correlation between behavior and theory have been constructed with diameters as small as 0.010 inch. Larger probes with diameters up to 0.5 inch have also been tested.

In the embodiment under consideration and with specific reference to the block diagram of FIG. 1, two R.F. DRIVERS, "$\omega_1$" and "$\omega_2$," operating at frequencies of 8- and 11-mc. respectively are employed. Except for their output frequencies, the drivers are substantially identical. Conventional circuit techniques are employed in the design of the drivers and the successful operation of the instrument is not limited to the use of the frequencies mentioned above. However care should be taken to select driver frequencies, in which the second harmonics are each sufficiently separated from the sum-frequency component of the flux change being sensed by the probe wire. Moreover, the combination of the higher order odd harmonics of the fundamental driver frequencies should not produce difference frequencies within the range of the sensed signal. In general, the drivers utilize crystal oscillators to insure maximum stability. The amplifiers are neutralized and incorporate $\pi$-network output circuits. Potentiometers in the amplifier screen-grid circuits permit adjustment of the RF output levels with further control available by adjustment of the $\pi$-network output capacitances.

The 19-Mc. SENSE AMPLIFIER comprises three identical, separately shielded vacuum tube triode stages. A neutralized, grounded-cathode circuit is employed, with input and output link coupling to provide 90 ohm impedance levels. The last stage of the amplifier drives a germanium diode DETECTOR designed for use with a vacuum-tube voltmeter, which serves as the INDICATOR. The over-all voltage gain (19-mc. R.M.S. input to D.C. output) is approximately 50,000. Bandwidth of the circuit is about 100 kc., and the amplifier noise corresponds to less than 0.25 microvolt at the input.

Figure 6:
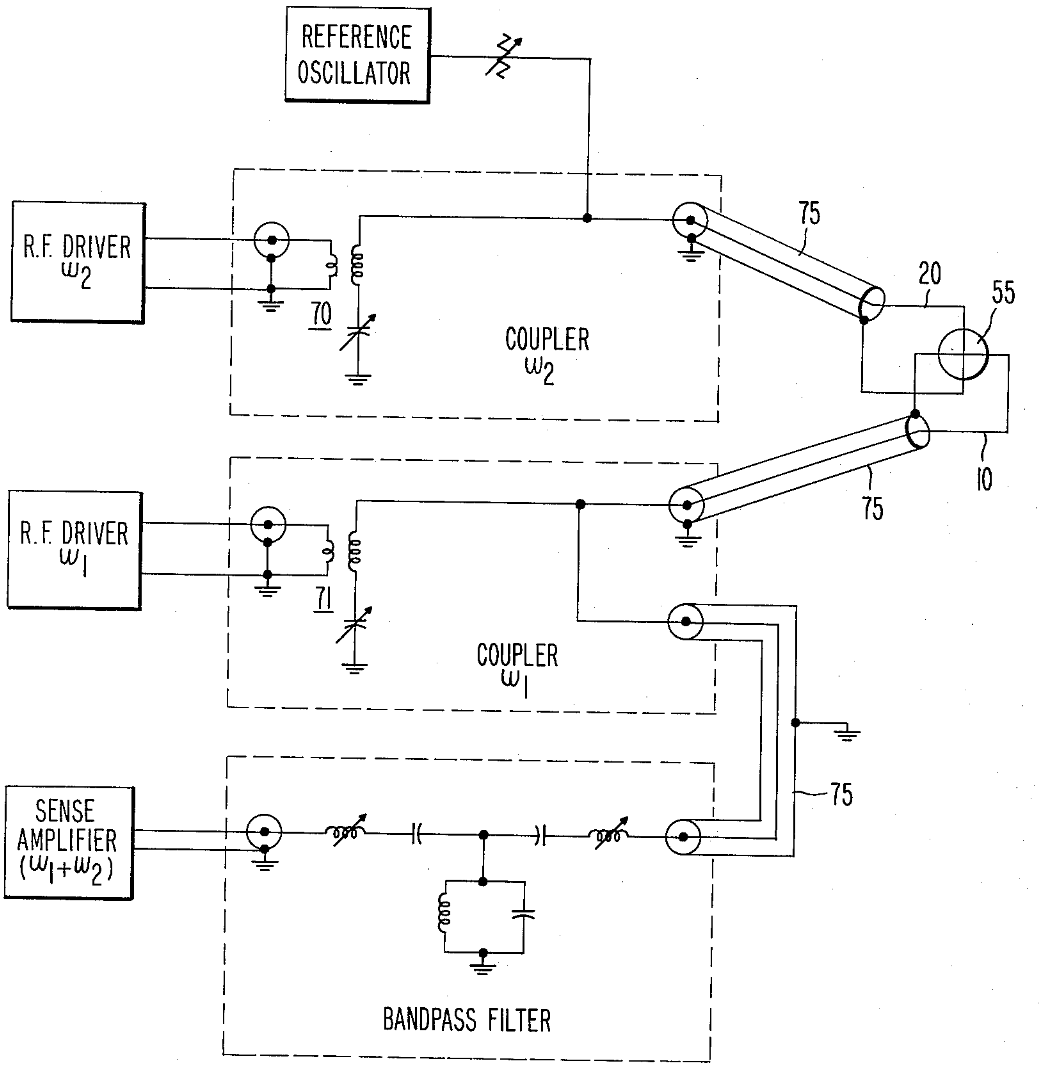
FIG. 6 is a schematic diagram of the coupling and filtering circuits utilized with the test instrument.

FIG. 6 illustrates schematically the circuits for coupling the R.F. DRIVERS to the probe wires 10 and 20, and the BANDPASS FILTER which couples one of the probe wires, 10, to the SENSE AMPLIFIER. Additionally, the connection between the REFERENCE OSCILLATOR and probe wire 20 is illustrated. This last connection is pertinent to the automatic nulling and recording system to be described hereinafter. The coupling between the 90 ohm lines from the R.F. DRIVERS and the low-impedance probe wires is accomplished by series-tuned circuits 70 and 71 located near the test fixture and connected by short lengths of coaxial cable 75 to the probe terminals. Thus, COUPLER $\omega_2$ links R.F. DRIVER $\omega_2$ with conductor 20; COUPLER $\omega_1$ couples R.F. DRIVER $\omega_1$ to conductor 10. The 8- and 11-mc. tuned circuits are each housed in separate metallic nonmagnetic containers. A similar container encloses the 19-Mc. BANDPASS FILTER which transfers only the desired output signal from probe wire 10 through a third 90 ohm line to the sense amplifier. The 8-mc. tank circuit of R.F. DRIVER $\omega_1$ presents a sufficiently high impedance at 19-mc. that the only load impressed on the probe at the latter frequency is the 90 ohm line to the sense amplifier. The 8-mc. tank circuit of R.F. DRIVER $\omega_1$ presents a sufficiently high impedance at 19-mc. that the only load impressed on the probe at the latter frequency is the 90 ohm impedance presented by the BANDPASS FILTER. Similarly, the BANDPASS FILTER causes negligible loading at 8-mc.

In the forgoing description of the instrument, it was noted that the sum-frequency output voltage is zero when the magnetization vector of the film is parallel with the direction of the sensed flux. The probe is rotated above the film until a null in output voltage is obtained. The angular position of the probe as indicated by the degree wheel attached thereto then corresponds to the angular position of the magnetization vector.

The usefulness of the instrument in studies of film uniformity is further extended by providing means for automatically rotating the probe to the null position, and for recording the null angle as the film is traversed beneath the probe. As mentioned hereinbefore in connection with FIG. 1, the automatic rotation of the probe is accomplished by a SERVO MOTOR driving the rim of the DEGREE WHEEL connected to the probe shaft. These are further illustrated in FIG. 4—the SERVO MOTOR being designated by reference numeral 80. With continued reference to FIG. 1, the direction of rotation of the SERVO MOTOR is controlled by the phase of an A.C. signal generated by the REFERENCE OSCILLATOR. This signal may conveniently be 400-c.p.s. although other frequencies are equally satisfactory. The output of the REFERENCE OSCILLATOR is applied concurrently to the REFERENCE WINDING of the SERVO MOTOR and to probe wire 20 so that a weak field is produced orthogonal to the direction of the magnetization vector M. The latter field causes small oscillations of the magnetization vector and corresponding variations in the DETECTOR output. The latter output is applied to the SERVO AMPLIFIER, which in turn supplies current to the CONTROL WINDING of the SERVO MOTOR.

In observing the detected output near the null, it is noted that the output voltage amplitude is zero when the sensing direction coincides with M, and increases in approximately linear fashion when an angular displacement of either M or the probe occurs. The polarity of the detected output is the same on either side of the null.

If the probe is set at exact null, the 400-c.p.s. perturbation field produces an increase in output voltage for both positive and negative half cycles. The output voltage waveform has no 400-c.p.s. component. Rather, the lowest frequency present is 800 c.p.s. If the probe is rotated clockwise or counterclockwise away from the null, output 400-c.p.s. waveforms are produced, similar in amplitude but opposite in phase. Thus the 400-c.p.s. output signal provides the information required for correcting the angle of the probe during test.

The DRIVE CONTROL potentiometer in the 400-c.p.s. injection line permits adjustment of the perturbation current, while the GAIN CONTROL associated with the SERVO AMPLIFIER adjusts loop gain. The INDICATOR which is used to determine the primary nulls during manual operation, is helpful as a monitoring device during automatic operation. The SERVO AMPLIFIER output appearing across the CONTROL WINDING drives the SERVO MOTOR at normal speed with approximately 1-millivolt R.M.S., 400-c.p.s. input, in the representative embodiment described herein.

In operating the automatic system, the PROBE is manually set in the vicinity of the null and the DRIVE and GAIN CONTROLS adjusted until the SERVO MOTOR starts to operate. If the loop phasing is correct, the motor will run until the error signal disappears at the null. Reversal of the film magnetization results in the inversion of the required servo phasing. In the present configuration, the servo system indication of the null was found to be precise, with no spurious indications in the vicinity thereof. A significant advantage of the automatic system over the manual, is that the SERVO MOTOR responds only to a coherent 400-c.p.s. signal, and is insensitive to wideband noise. Therefore the signal-to-noise ratio of the system is effectively improved over that obtained with the usual D.C. meter INDICATOR.

As illustrated in FIGS. 1 and 4, a direct recording of the DEGREE WHEEL angle is produced by the PEN RECORDER which is affixed directly to the wheel. As the film under test is traversed under the PROBE, the pen 85 makes a trace of the angular variations of M on a card 86 which is attached to the card holder 87. The displacement of the trace on the card is approximately proportional to the angle of rotation. As the film is manually traversed beneath the probe, a plot is produced having the magnetization angle as the ordinate, and the location on the film as abscissa.

Figure 7:
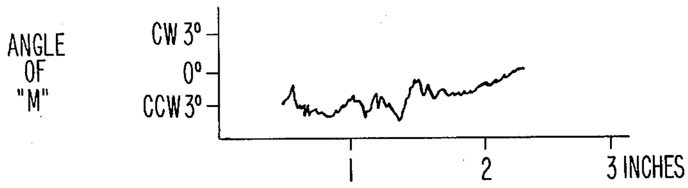
FIG. 7 is a reproduction of an actual plot of the easy-axis angular variation in a thin film sample.

FIG. 7 is a reproduction of one of the actual plots produced by the PEN RECORDER in a study of the easy-axis angular variation in a continuous thin film sample. In conducting a test of this kind the film is first saturated in its nominal easy direction and then the magnetization angle is plotted for one or more parallel traverses across the film. The theoretical position of the easy axis resulting from the magnetic material deposition process is assumed to be parallel to the edge of the substrate. Therefore the displacement of the trace in FIG. 7 from the 0° line indicates skewing of the easy axis relative to the substrate edge. Sloping of the trace corresponds to a gradual change in easy axis direction across the film. Superimposed upon the gradual change are localized variations caused by pinholes, scratches, and inhomogeneities. The plot shown in FIG. 7 was made using an 0.12 inch diameter probe spaced approximately 0.025 inch from the film. If the same plot had been made with a closley spaced, smaller-diameter probe, larger localized angular variations would have been evident.

Measurement of the easy axis direction of a given film spot may be accomplished by using the Helmholtz coil field as a reference. One way of accomplishing this measurement is to manually rotate the base 35 to which the sample 30 is affixed while alternately applying and removing a small Helmholtz coil field to the sample. By observation of the INDICATOR, a position will be attained for which no disturbance of M occurs. The easy axis is then parallel to the applied field. Alternatively, the base may be rotated until application of a small Helmholtz coil field produces equal and opposite M rotations as observed on the INDICATOR, for reversals of the coil current. The easy axis is then perpendicular to the applied field. The graduations on the base 35 indicate the angular orientation of the film substrate with respect to the applied field.

Figure 8:
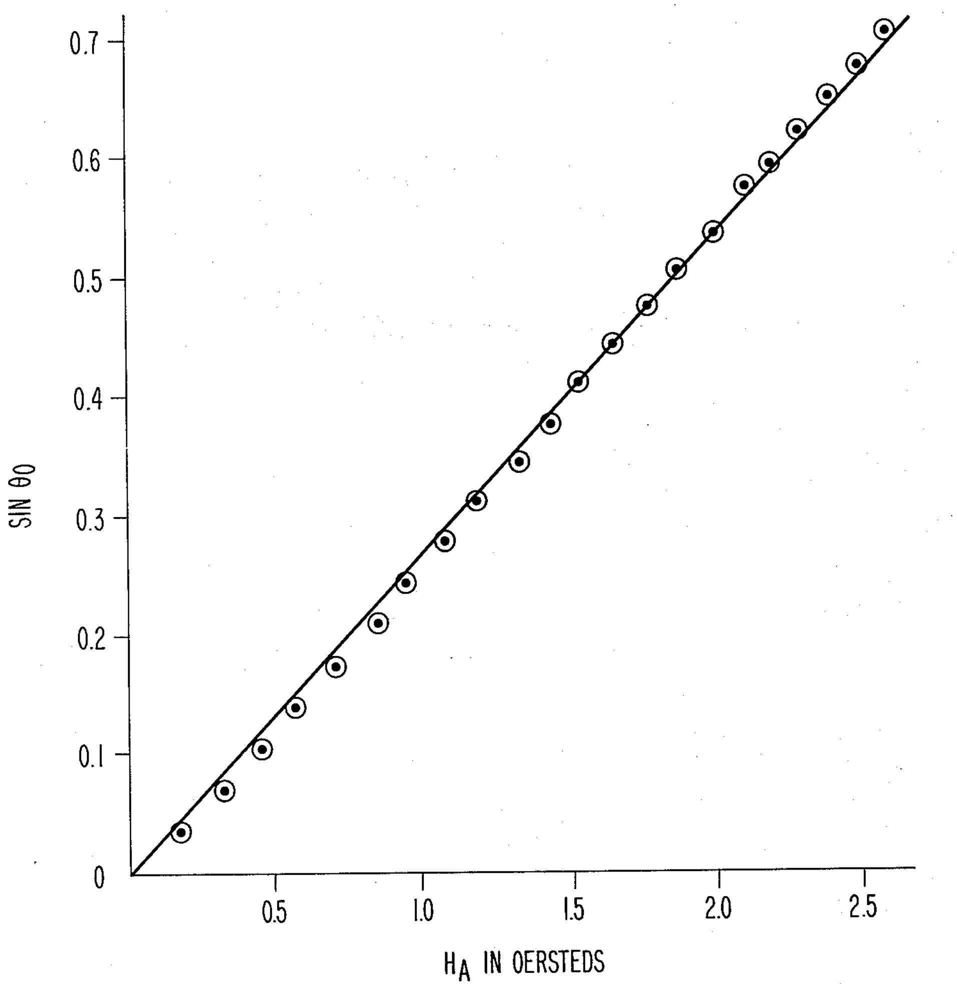
FIG. 8 is a graph plotted from actual experimental data and illustrating the measurement of the anisotropy field, $H_k$.

FIG. 8 indicates a method of measurement of $H_k$ from the angular rotation of M under the influence of an applied D.C. field in the hard direction. The anisotropy field constant $H_k$ is defined as the magnitude of the transverse field required to rotate M through 90°. The reversible rotation limit of a given film may be considerably less than 90°, but calculation of $H_k$ may be made from the smaller reversible rotations by means of the following formula:

$$\theta_0=\sin^{-1}H_y=\sin^{-1}(H_A/H_k)$$

where $H_A$ is the applied transverse field in oersteds, $H_k$ is the anisotropy field constant in oersteds, and $H_y$ is the normalized transverse field. FIG. 8 shows sin $\theta_o$ vs $H_A$ for a typical film. The inverse of the slope of the line through the experimental points is $H_k$. Any one of the data points for $\theta_o$ equal to or larger than 10° would yield a value of $H_k$ accurate to within plus or minus 5%. The graph of FIG. 8 is a reproduction of the actual data taken with the instrument depicted in FIG. 4 and using a probe of 0.24 inch diameter spaced 0.025 inch from the film.

It has been found that the small size of the crossed-wire probe and the small perturbation of M caused by the probe fields make many previously difficult measurements quite simple. Skew and the variation of the easy axis across the film, and amplitude dispersion of $H_k$ are obtained directly by positioning different parts of the film under the probe and measuring the parameters. Another application of the instrument is the measurement of the response of magnetic material to a nonhomogenous applied field. This is accomplished by exploring the areas in proximity to a conductor carrying D.C. current placed on the film. The area resolution of the measurements depends primarily on the size of the probe and the distance from the probe to the film. The resolving power of the instrument increases proportionately if the spacing between the probe and film sample is decreased, or if the diameters of the probe and probe wires are minimized. For spacings which are small compared to the probe diameter, significant response is confined to the area directly beneah the probe. Resolution of the order of 0.010 inch has been realized.

From the foregoing description of the invention and its mode of operation, it will be evident that the present instrument facilitates the accurate measurement of various parameters of magnetic thin film storage elements. Data on thin films which is readily obtained through the use of the present instrument, has hitherto been unobtainable or available only through the use of complicated equipment and time-consuming measuring techniques.

While there have been shown and described the fundamental novel features of the invention as applied to an actually operative embodiment, it is to be understood that various omissions, substitutions and changes in form and details of the device illustrated, and in its operation, may be made by those skilled in the art without departing from the spirit of the invention. Therefore, all such variations as are in accord with the principles discussed previously are meant to fall within the scope of the appended claims.

What is claimed is:

1. An instrument for measuring the parameters of magnetic material possessing an average magnetic moment and being capable of attaining opposed states of residual flux density along a preferred axis of magnetization, comprising means for applying to a portion of said material radio frequency magnetic fields in fixed orthogonal relationship to each other, said radio frequency fields being of such magnitude as to vary but not reverse the direction of magnetization of said portion of said material, means for causing an angular displacement of said radio frequency fields with respect to the physical position of said portion of said material, means for sensing a preselected combinatorial frequency component of the magnetic flux generated by said radio frequency fields in said portion of said material, the amplitude and phase of said frequency component being a function of both the angular relationship between the directions of the magnetic moment and the preferred axis in said portion of said material and that between said radio frequency fields and the magnetic moment in said portion of said material, said frequency component being zero when said latter component coincides with said magnetic moment, thereby correlating the absolute angular displacement of said radio frequency fields with the position of the magnetic moment.

2. An instrument for measuring the parameters of a ferromagnetic storage element possessing an average magnetic moment and being capable of attaining opposed states of residual flux density along a preferred axis of magnetization comprising means for applying to a portion of said element two distinct radio frequency magnetic fields in fixed orthogonal relationship to each other, said radio frequency fields being of insufficient magnitude to cause an irreversible change in the magnetization of said portion of said element, means for causing an angular displacement of said radio frequency fields with respect to the preferred axis of said portion of said element as a reference, means for sensing the sum-frequency component of the magnetic flux generated by said radio frequency fields in said portion of said element, the amplitude and phase of said sum-frequency component being a function of both the angular relationship between the directions of the magnetic moment and the preferred axis in said portion of said element and the angle between said radio frequency fields and the direction of said magnetic moment in said portion of said element, said sum-frequency component being zero when said latter component coincides with said magnetic moment, the absolute angular displacement of said radio frequency fields when said sum-frequency component is zero corresponding to the angle between the magnetic moment and the preferred axis in said portion of said element.

3. An instrument as defined in claim 2 wherein said means for causing an angular displacement of said radio frequency fields includes means for giving a direct indication in degrees of the angle between the magnetic moment and the preferred axis when said sensed sum-frequency component is zero.

4. An instrument for observing the position of the magnetization vector in any selected portion of a ferromagnetic thin film element capable of assuming opposed states of residual flux density along a preferred axis of magnetization, comprising a pair of electrical conductors arranged in fixed orthogonal relationship to each other and positioned in close proximity to said portion of said element, means operatively connected to said conductors for driving currents of distinct radio frequencies respectively therethrough, whereby radio frequency magnetic fields are applied to said portion of said element, said radio frequency fields being of such magnitude as not to cause an irreversible change in the magnetization of said portion of said element, means for altering the angular position of said radio frequency fields with respect to the preferred axis of said portion of said element as a reference, means including a preselected one of said conductors for sensing the sum-frequency component of the magnetic flux generated by said radio frequency fields in said portion of said element, said sensed sum-frequency component being zero when said latter component coincides with said magnetization vector, the absolute angular position of said radio frequency fields when said sum-frequency component is zero corresponding to the angle between the magnetization vector and the preferred axis in said portion of said element.

5. An instrument for observing the position of the magnetization vector in any selected portion of a ferromagnetic thin film element while said element is under the influence of an applied D.C. field, said element being capable of assuming opposed states of residual flux density along an axis of anisotropy, said instrument comprising means for applying to said element a D.C. magnetic field having a component transverse to said axis of anisotropy, whereby the magnetization vector of said element is rotated toward a direction transverse to said axis of anisotropy, first and second electrical conductors, a section of each of said conductors being disposed in a plane parallel to said element and in orthogonal relationship to the other, said sections of said conductors being positioned in close proximity to said portion of said element, means operatively connected to said conductors for driving currents of different radio frequencies respectively therethrough, whereby radio frequency magnetic fields are applied to said portion of said element, said radio frequency fields being of such amplitude as not to cause an irreversible change in the magnetization of said portion of said element, means for causing an angular displacement of said radio frequency fields with respect to the preferred axis of said portion of said element as a reference, means including said first conductor for sensing the sum-frequency component of the magnetic flux generated by said radio frequency fields in said portion of said element, said sensed sum-frequency component being zero when said section of said first conductor is orthogonal to the direction of said magnetization vector, the absolute angular displacement of said radio frequency fields when said sum-frequency component is zero corresponding to the angle through which the magnetization vector in said portion of said element is rotated in response to said applied D.C. magnetic field.

6. An instrument for measuring the parameters of magnetic material possessing an average magnetic moment and being capable of attaining opposed states of residual flux density along a preferred axis of magnetization, comprising a probe having affixed to one extremity thereof first and second electrical conductors in orthogonal relationship to each other, means for positioning said one extremity of said probe in close proximity to a portion of said magnetic material, means operatively connected to said conductors for driving currents of distinct radio frequencies respectively therethrough, whereby radio frequency magnetic fields are applied to said portion of said material, said radio frequency fields being of such magnitude as not to cause an irreversible change in the magnetization of said portion of said material, means for rotating said probe whereby the angular position of said radio frequency fields is altered with respect to the preferred axis of said portion of said material as a reference, means including said first conductor for sensing the sum-frequency component of the magnetic flux generated by said radio frequency fields in said portion of said material, said sensed sum-frequency component being zero when said first conductor is positioned orthogonal to the direction of said magnetic moment, the angle through which said probe is rotated to sense a zero sum-frequency component of flux corresponding to the angle between the magnetic moment and the preferred axis in said portion of said material.

7. An instrument as defined in claim 6 wherein said means operatively connected to said conductors for driving currents of distinct radio frequencies therethrough includes individual radio-frequency current drivers coupled by means of series-tuned circuits respectively to said conductors.

8. An instrument as defined in claim 6 including means for giving a direct indication of the angle between the magnetic moment and the preferred axis, said last means comprising a wheel graduated in degrees and coupled to the other extremity of said probe by means of a common shaft, whereby the rotation of said wheel causes a corresponding rotation of said probe.

9. An instrument for measuring the parameters of any selected portion of a ferromagnetic thin film element possessing an average magnetic moment and being capable of assuming opposed states of residual flux density along a preferred axis of magnetization comprising a base for supporting said thin film element, means for applying to said element a D.C. magnetic field perpendicular to said preferred axis, whereby the magnetic moment of said element is rotated toward a direction transverse to said preferred axis, a nonmetallic probe having affixed to one end thereof first and second electrical conductors in orthogonal relationship to each other, means for positioning said one end of said probe in close proximity to a portion of said element, means operatively connected to said conductors for driving currents of distinct radio frequencies respectively therethrough, whereby radio frequency magnetic fields are applied to said portion of said element, said radio frequency fields being of such magnitude as not to cause an irreversible change in the magnetization of said portion of said element, means including said first conductor for sensing the sum-frequency component of the magnetic flux generated by said radio frequency fields in said portion of said element, said sensed sum-frequency component being zero when said first conductor is positioned orthogonal to the direction of said magnetic moment, the angular position of said conductors with respect to said preferred axis for a zero amplitude sensed sum-frequency component and in the absence of an applied D.C. field serving as a reference position, means operable in response to the application of a D.C. field to said element for rotating said probe and thereby altering the angular position of said conductors and the corresponding radio frequency fields from said reference position to a second position at which said sensed sum-frequency component has a zero amplitude, the angular rotation of said probe in degrees corresponding directly to the angle through which the magnetic moment in said portion of said element is rotated by said applied D.C. field, and means for giving a direct indication of the angular rotation of said probe.

10. An instrument as defined in claim 9 wherein said base for supporting said thin film element includes a traversing mechanism for positioning said selected portion of said element beneath said probe.

11. An instrument as defined in claim 9 including means for rotating said base and the film element supported thereby through 360 degrees in the plane of the element with respect to said applied D.C. magnetic field, the axis of rotation of said base coinciding with the axis of rotation of said probe whereby the portion of said element in close proximity to said one end of said probe undergoes no translation with respect to said applied D.C. magnetic field during the rotation of said base.

12. An instrument as defined in claim 9 wherein said means for rotating said probe comprises a servo system including a servo motor having a reference and a control winding, said servo motor being operatively connected to said probe, an oscillator for applying a control signal concurrently to said reference winding and to said second conductor, said sensing means including said first conductor being responsive to the flux changes in said portion of said element caused by said control signal, a servo amplifier having an output terminal coupled to said control winding of said servo motor, means for applying the sensed control signal to said amplifier, the output of said amplifier having a substantially zero amplitude component at the control signal frequency when said first conductor is positioned orthogonal to the direction of said magnetic moment in said portion of said element.

13. An instrument as defined in claim 9 wherein said sensing means including said first conductor also comprises a band-pass filter coupled to said first conductor and adapted to pass said sum-frequency signal component, means coupled to the output of said filter for amplifying and detecting said sum-frequency signal, and indicator means for displaying said detected signal.

14. In a system for measuring the parameters of any selected portion of a ferromagnetic thin film storage element possessing an average magnetic moment and being capable of assuming opposed states of residual flux density along a preferred axis of magnetization, the combination comprising a base for supporting said storage element, a pair of Helmholtz coils positioned respectively on opposite sides of said base, means operatively connected to said coils for driving current therethrough, whereby a D.C. magnetic field is applied to said element, means for rotating said base and the storage element supported thereby through 360 degrees in the plane of the element with respect to said D.C. field, a probe mount assembly attached to said base, said latter assembly including a support arm having a bushing for carrying a shaft, a degree wheel and a probe connected respectively to opposite ends of said shaft, said probe having affixed to one end thereof first and second probe wires crossing each other at right angles, said bushing permitting the adjustment of the spacing between said one end of said probe and a selected portion of said element, means operatively connected to said probe wires for driving distinct radio frequency currents therethrough whereby radio frequency magnetic fields are applied to said portion of said element, said radio frequency fields being of such magnitude as not to cause an irreversible change in the magnetization of said portion of said element, said degree wheel being actuatable for causing the rotation of said probe and thereby altering the angular position of said radio frequency fields with respect to the preferred axis of said element as a reference, the probe axis of rotation coinciding with the axis of rotation of said base, means including said first probe wire for sensing the sum-frequency component of the magnetic flux generated by said radio frequency fields in said portion of said element, said sensed frequency component being zero when said first probe wire is positioned at a right angle to the direction of said magnetic moment, the angle through which said probe is rotated to sense a zero sum-frequency component of flux corresponding to the angle between the magnetic moment and the preferred axis in said portion of said material, said last angle being indicated directly by said degree wheel.

15. A system as defined in claim 14 including means for alignment of said base so that the ambient magnetic field is perpendicular to said storage element.

16. A system as defined in claim 14 wherein said degree wheel is rotated by a servo system including a servo motor having a reference and a control winding, said servo motor being attached to said support arm and arranged to drive the rim of said degree wheel, an oscillator for applying a control signal concurrently to said reference winding and to said second probe wire, said sensing means including said first probe wire being responsive to the flux changes in said portion of said element caused by said control signal, a servo amplifier having an output terminal coupled to said control winding of said servo motor, means for applying the sensed control signal to said amplifier, the output of said amplifier having a substantially zero amplitude at the control signal frequency when said first probe wire is positioned at a right angle to the direction of said magnetic moment in said portion of said element.

17. A system as defined in claim 16 including a traversing mechanism attached to said base for successively positioning selected portions of said element beneath said probe.

18. A system as defined in claim 17 including means for recording the angular position of the magnetic moment in selected portions of said element as said element is traversed beneath said probe, said last means comprising a pen attached directly to said degree wheel, a record card attached to said base and positioned in contact with said pen, the angle of rotation of said degree wheel resulting in a substantially proportional displacement of the trace on said card, whereby a plot of the magnetic moment angular displacement versus location of said portion of said element is generated.

19. A system as defined in claim 14 wherein said means including said first probe wire for sensing said sum-frequency component of flux also comprises a band-pass filter coupled to said first probe wire, a sense amplifier coupled to the output of said filter, a detector coupled to the output of said sense amplifier for converting said amplified sum-frequency component to a D.C. voltage level, and indicator means for monitoring and displaying said voltage level.

No references cited.

RICHARD B. WILKINSON, *Primary Examiner.*